United States Patent
Zlatanof

[11] Patent Number: 6,033,591
[45] Date of Patent: Mar. 7, 2000

[54] CELLULAR THERMAL INSULATING MATERIAL BASED ON DIATOMACEOUS EARTH AND METHOD FOR ITS PRODUCTION

[75] Inventor: Bassilios Zlatanof, Viereth, Germany

[73] Assignee: E. Schwenk Dammtechnik GmbH & Co., Landsberg, Germany

[21] Appl. No.: 09/030,065

[22] Filed: Feb. 25, 1998

[30] Foreign Application Priority Data

Feb. 26, 1997 [DE] Germany .................. 197 07 700

[51] Int. Cl.[7] ...................................... E04B 1/74
[52] U.S. Cl. .................. 252/62; 106/605; 106/608; 106/735; 264/42; 264/333
[58] Field of Search ................. 252/62; 264/42, 264/333; 106/605, 608, 735

[56] References Cited

U.S. PATENT DOCUMENTS 5,520,729 5/1996 Engert et al. .

FOREIGN PATENT DOCUMENTS 2144250 9/1995 Canada .
0 247 346 12/1987 European Pat. Off. .
247346 12/1987 European Pat. Off. .

OTHER PUBLICATIONS

Chemical Abstract, 93:154837k, vol. 93, No. 16, Oct. 20, 1980.

Chemical Abstract, 101:27545x, vol. 101, No. 4, Jul. 23, 1984.

Chemical Abstract, 103:23957b, vol. 103, No. 4, Jul. 29, 1985.

Chemical Abstract, 105:65411r, vol. 105, No. 8, Aug. 25, 1986.

*Primary Examiner*—Paul Marcantoni
*Attorney, Agent, or Firm*—Finnegan, Henderson, Farabow, Garrett & Dunner L.L.P.

[57] ABSTRACT

A thermal insulating material with a cellular structure is disclosed which comprises a bound $SiO_2$-containing material converted to at least 90% into a tobermorite phase. The $SiO_2$-containing material is diatomaceous earth, the density of the thermal insulating material is less than 150 kg/m$^3$ and the thermal conductivity (declared value) is less than 0.05 (W/m·K).

11 Claims, No Drawings

CELLULAR THERMAL INSULATING MATERIAL BASED ON DIATOMACEOUS EARTH AND METHOD FOR ITS PRODUCTION

BACKGROUND OF THE INVENTION

The present invention relates to a thermal insulating material based on diatomaceous earth, particularly a cellular thermal insulating material and method for its production.

In the production of thermal insulating materials, one usually begins with a framework or matrix former and a bonding agent which are expanded in order to obtain structures with air-filled pores that have particularly good heat insulating properties.

Production of a thermal insulating material of $SiO_2$-containing material (framework former), calcium hydroxide, water, foam and reactive aluminates contained in regulated set cement is known from DE-A1-43 39 137. The pourable crude mixture made from these materials is filled into forms. After sufficient hardening of the crude mixture, the blank pieces are removed from the forms and autoclaved. Slow heating (corresponding to the saturated heat curve) occurs for autoclaving, followed by a holding phase of 8 hours at about 14 bar (corresponding to about 198° C.) and then a cooling phase of two hours. According to DE-A1-43 39 137, a quartz powder with a maximal particle size of about 20 μm, particularly from 2 to 3 μm, is used as a $SiO_2$-containing material. Calcium hydroxide is used in the crude mixture in an amount which is essentially stochiometric to the amount necessary for the complete conversion of the quartz powder to tobermorite and of the reactive aluminate contained in the regulated set cement to monophases and (secondary) ettringete. A practically complete material conversion of quartz and calcium hydroxide to tobermorite is achieved with steam curing in the autoclave.

DE-A1-44 08 088 relates to a method for the production of a porous mineral light insulating board which starts from a bonding agent slurry of cement, quartz powder (as a framework former), calcium hydroxide and water, mixes this with a separately produced foam and makes a formed cake for the light insulating boards from the obtained mixture. After stiffening of the formed cake, this is cut into individual light insulating boards which are then cured in an autoclave. DE-A1-44 08 088 also teaches a water-repellent and/or hardening impregnation as a final treatment for the autoclaved light insulating boards.

Thermal insulating material densities between 100 and 200 kg/m$^3$ are achieved with the methods known in the art. For example, a density of 100 kg/m$^3$ in the dry state is given in DE-A1-44 08 088 for a light insulating board. The light insulating boards produced in this manner typically have a specific thermal conductivity of 0.045 (W/m·K).

However, such light insulating boards have several serious disadvantages. For one, the specific thermal conductivity is still comparatively high and not suitable at all for thermal insulation where large temperature gradients exist. Furthermore, as a result of the specific density of the quartz (ca. 2.7 kg/m$^3$), insulating boards produced with quartz powder are breakable because only 36.7 l of solid matrix is available in an insulating board with a density of 100 kg/m$^3$ with an air volume of 962.5 l in the cells of the boards. In order to achieve maximal strength of the matrix, the quartz sand must also have a particle size in the range from 2 to 8 μm. On the one hand, this leads to problems (for example airborne dust) in handling the powdered quartz sand in the production method and, on the other hand, to dust formation in breakage or with abrasive wear of the insulating boards. Further, quartz dust (airborne dust) leads to serious lung diseases (silicosis) with long term exposure.

Additionally, conventional mineral insulating boards lead to insufficient adhesion between boards and the applied plaster which is often due to dust formation.

Methods which employ quartz powder as a framework and/or matrix material have the further disadvantage that the quartz itself does not have any hydraulic properties and, therefore, long pre-hardening times and/or large amounts of bonding agent are sometimes necessary.

The object of the present invention is to provide a thermal insulating material having improved thermal insulating properties, improved adhesion properties (with plaster) and an improved mechanical strength, especially at high temperatures, and whose use does not involve any health risks.

The object of providing a method for the production of such a thermal insulating material is also connected with this.

SUMMARY OF THE INVENTION

The problem is solved by a thermal insulating material with a cellular structure which comprises bound diatomaceous earth converted to at least 90% into a tobermorite phase, wherein the bulk density of the thermal insulating material is less than 150 kg/m$^3$ and the thermal conductivity is less than 0.05 (W/m·K).

The bulk density of the thermal insulating material according to the invention is preferably less than 100 kg/m$^3$. The thermal conductivity is preferably less than 0.04 (W/m·K).

The $SiO_2$-containing material is preferably converted 100% into a tobermorite phase.

The thermal insulating material is preferably a thermal insulating board.

The method according to the invention relates to the production of this thermal insulating material and comprises the following steps:

the development of a cellular structure of a crude mixture which contains (a) diatomaceous earth as a $SiO_2$-containing material, (b) CaO and/or cement and (c) water, the formation of the foamed crude mixture, the hardening of the formed piece obtained in this manner, a hydrothermal treatment of the hardened formed piece in an autoclave under conversion to at least 90% of the $SiO_2$-containing material into a tobermorite phase.

The crude mixture preferably contains ca. 1 part per weight diatomaceous earth ca. 1.2 parts per weight CaO and/or cement ca. 4.5 parts per weight water.

With the use of a CaO/cement mixture, the ratio of CaO/cement is preferably ca. 1:7.

Aside from the components given above, the crude mixture can optionally contain small amounts of natural gypsum and a filler material, especially a fibrous filler material (for example, cotton fibers).

DETAILED DESCRIPTION OF THE INVENTION

Diatomaceous earth consists of diatom shells. Diatomaceous earth is a sediment belonging to the siliceous rocks which consists of 70 to 95% amorphous silicic acid ($SiO_2 \cdot nH_2O$). It is built-up from the variously formed silica skeletons of unicellular, microscopically small algae (for example, Thalassiosira fluviatilis, Navicula pelliculisa, Triceratium venosum, Stylodidilium exzentricum) living in fresh or salt water since the Triassic period. The shells have exceptionally numerous, fine grooves, cavities and canals such that diatomaceous earth is distinguished by a very low density. The length of the individual diatom casings typically lies between 0.090 to 0.150 mm and their width between 0.0015 and 0.0046 mm. The porosity is 83% to 85%. The thermal conductivity of diatomaceous earth lies in the range from 0.04 to 0.06 (W/m·K).

The diatomaceous earth is ground in a mill in such a manner that the individual diatom shells are preferably separated from each other before they are added to the crude mixture. Subsequently, the diatomaceous earth preferably has an average particle size in the range from 10 to 30 μm.

The crude mixture with the ingredients described above is expanded to a cellular structure in the first step of the method according to the invention. In this connection, the cellular structure can be created directly in the crude mixture by a gas-producing agent or a foaming agent.

Foam-producing proteins, for example, SB3 from the company Heidelberger Zement, Leimen (Germany) are suitable as foaming agents. A preferred gas-producing agent is aluminum powder, for example, $Al_2$ SK IV NE 170, STAPA, Eckart-Werk, Furth, Germany, which releases hydrogen under the basic conditions in the crude mixture and creates foam and/or bubbles in this manner.

The aluminum powder is preferably employed in an amount of 0.7 to 1.0 kg with respect to 1 $m^3$. Preferable amounts for the use of foam-producing proteins lie in the range of 2 to 3 1 with respect to 1 $m^3$.

During expansion, a stable, homogenous suspension is created from the crude mixture. Preferably, a variable mixer is employed stepwise for this. Such mixers are also suitable to maintain the filler material in suspension.

Subsequently, the suspension is formed, preferably by pouring into a casting mold. The crude mixture is then only hardened for so long until the formed piece has a sufficient stability in order to be further treated and processed. Preferably, the formed piece is hardened by heating it, especially by heating it for 18–22 h to a temperature of 30–50° C.

Generally, the pre-hardened formed piece is subsequently removed from the casting mold and brought into the desired final form by cutting for example. Preferably, the formed piece is cut into boards in this step. However, it is also possible to carry out cutting to the final form after the subsequent step (hydrothermal treatment).

The hydrothermal treatment of the formed piece is carried out in a typical manner by autoclaving the formed piece (optionally after cutting). The hydrothermal treatment is preferably carried out for 12–16 hours at temperatures of 174–203° C. The pressures achieved in the hydrothermal treatment generally lie in the range of 9–17 bar. The steam formed under these conditions leads to conversion of the diatomaceous earth with CaO and/or cement into tobermorite. The formed tobermorite decisively contributes to the strength and volume stability of the insulating material framework.

The thermal insulating material obtained is optionally dried after the hydrothermal treatment. After drying, the water content of the thermal insulating material is preferably not more than 5 percent by weight.

A hydrophobizing step is also preferably employed after the hydrothermal treatment and/or drying. For hydrophobizing, the thermal insulating material can be treated in a know manner either with a hydrophobizing steam which is absorbed by the thermal insulating material or by impregnation with a fluid (for example, in a dipping bath).

In steam hydrophobizing, the thermal insulating material is exposed to silane-containing steam which hydrophobizes the surface of the insulating material.

In fluid impregnation, a water-repellent (hydrophobizing) and self-hardening impregnation is advantageously used. It is also possible to introduce the impregnating agent into the thermal insulating material by excess pressure or low pressure, whereby low pressure methods are preferred.

For example, in the low pressure method, the boards of the thermal insulating material are brought into a dipping bath which is completely filled with the impregnating agent. Subsequently, the dipping bath is sealed air-tight and depressurized. Thereby, the air found in the open-celled structure of the boards bubbles out and can be drawn off. If the dipping bath is then brought to normal pressure again, the impregnating agent surrounding the boards is soaked into the boards.

Mixtures based on modified water glass of a hydrophobizing agent, optionally a cross-linker, and residual water and/or thermosetting, hydrophobic plastic dispersions are suitable as impregnating agents for example. A typical impregnating agent is WACKER BS 15, Wacker Chemie, Burghausen, Germany.

Alternatively, the hydrophobizing can also occur in the crude mixture.

As compared to customary thermal insulating materials, the thermal insulating materials according to the invention are distinguished by a lower density and a lower thermal conductivity with greater strength. This effect is achieved for one because diatomaceous earth has a better thermal insulating action than quartz powder because of its porosity. Further, despite its lower density in comparison to thermal insulating materials based on quartz powder, it is possible to incorporated up to four times more solid particles into the framework in the thermal insulating material according to the invention which decisively promotes the strength. Additionally, the tubules, small rods and needle forms of diatomaceous earth (sponges, spicules, nitchia) in the hardened framework have an isotropic stiffening and/or strengthening effect (isotropic reinforcement), and in this manner, increase the tensile strength in bending of the thermal insulating material. The product according to the invention is safe from a health stand point because it does not release any silicosis-promoting quartz materials. A further advantage of the thermal insulating material according to the invention is it suitability for thermal isolation at high temperatures (above 550° C.), whereas quartz powder no longer guarantees sufficient stability at temperatures above 550° C. as a result of the low quartz content. In tests, the thermal insulating material according to the invention demonstrates a thermal insulating effect at temperatures up to 650° C.

The method according to the invention differs from known methods, which concern the use of quartz powder, by the safe use of diatomaceous earth from a health stand point. A further advantage of the use of diatomaceous earth lies in the hydraulic activity of diatomaceous earth which promotes the binding effect of the bonding agent (CaO and/or cement) and permits acceleration of the individual method steps, especially the hardening before the hydrothermal processing. The larger reactive surface of diatomaceous in comparison to quartz powder also contributes to better binding. A further advantage is that is not necessary to employ special types of cement or other special bonding agents. These advantages contribute to the economic efficiency of the method.

The present invention is more closely illustrated by an example.

EXAMPLE production of thermal insulating boards with a density of 85 kg/m$^3$.

| The following starting materials were employed: | |
| --- | --- |
| diatomaceous earth | 40 kg |
| cement CEM I 52.5 R | 40 kg |
| CaO (active lime) | 6 kg |
| gypsum (calcium sulfate × 2 H$_2$O) | 1 kg |
| cotton fibers | 0.6 kg |
| water | 180 kg |
| foam-producing protein | 3 l |

The dried diatomaceous earth was ground together with the gypsum (to an average particle size of 20 μm) and stored in a silo.

The diatomaceous earth/gypsum mixture, the cement and the lime were added over a metering mechanism into a mixer in which the water with the foam-producing protein was presented and foamed. Thereafter, the cotton fibers were added.

The homogenous mixture was then filled into a casting mold.

For hardening ('green strength'), the blank piece in the casting mold was led to a regenerating chamber where it pre-hardened for 20 hours at 40° C.

The pre-hardened green product was removed from the casting mold and cut into boards.

These boards were transferred into an autoclave tank for the hydrothermal treatment. The hydrothermal treatment was carried out over 12 hours at a temperature of 203° C. The pressure was 17 bar. Thereafter, the boards were cooled in the autoclave.

After cooling, the boards were removed from the autoclave and dried to a maximal water content of 5% in a drying chamber at 60° C.

Subsequent to the drying step, the thermal insulating boards were processed by treatment with a hydrophobizing steam (Wacker Silan M1-Trimethoxy, Wacker Chemie, Burghausen, Germany).

The board(s) produced in this manner has (have) a thermal conductivity of 0.038 (W/m·K) with a relative density of 85 kg/m$^3$ in the completely dried state. The boards do not release any dust.

I claim:

1. Thermal insulating material with a cellular structure which comprises a bound SiO$_2$-containing material converted to at least 90% into a tobermorite phase, wherein the SiO$_2$-containing material is diatomaceous earth, the bulk density of the thermal insulating material is less than 150 kg/m$^3$ and the thermal conductivity (declared value) is less than 0.05 (W/m·K).

2. Thermal insulating material according to claim 1, wherein the SiO$_2$-containing material is completely converted into a tobermorite phase.

3. Thermal insulating material according to claim 1, wherein the bulk density of the thermal insulating material is less than 100 kg/m$^3$ and the thermal conductivity (declared value) is less than 0.04 (W/m·K).

4. Thermal insulating material according to claim 1, wherein the diatomaceous earth is amorphous.

5. Thermal insulating material according to claim 1, wherein the thermal insulating material is a thermal insulating board.

6. A method for the production of a thermal insulating material having a cellular structure according to claim 1 comprising the following steps: providing a mixture of (a) the diatomaceous earth as the SiO$_2$- containing material, (b) CaO and/or cement, and (c) water; foaming the mixture; molding the foamed mixture into a formed piece; hardening the formed piece; and subjecting the hardened formed piece to a hydrothermal treatment in an autoclave to convert at least 90% of the SiO$_2$- containing material into the tobermorite phase.

7. The method according to claim 6, wherein a foam-producing protein or aluminum powder is used to foam the mixture.

8. The method according to claim 6, wherein the formed piece obtained from the mixture is hardened by heating.

9. The method according to claim 6, wherein the hardened, formed piece is cut into a board before it is subjected to the hydrothermal treatment.

10. The method according to claim 6, wherein the formed piece is subjected to a hydrophobizing step after the hydrothermal treatment.

11. The method according to claim 6, wherein the mixture is subjected to a hydrophobizing step before it is molded into a formed piece.

* * * * *